Figure 1:
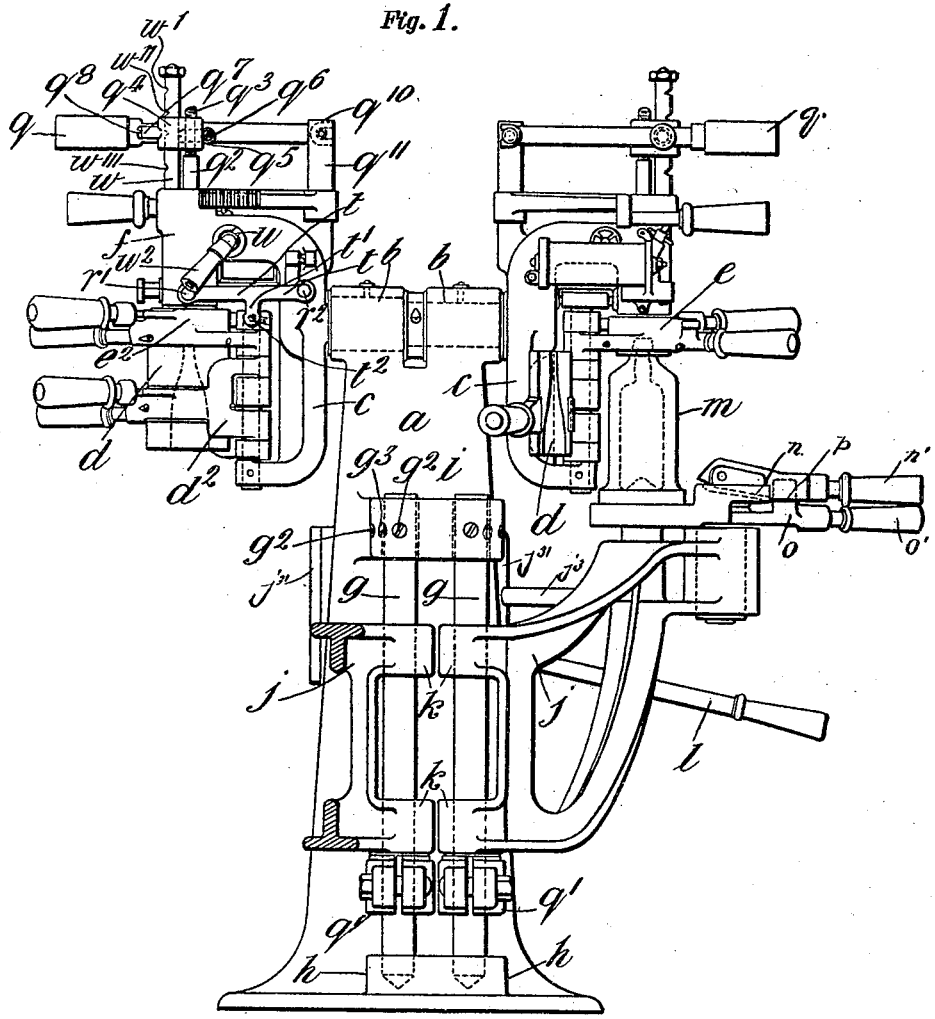

No. 795,304. PATENTED JULY 25, 1905.
F. H. PIERPONT.
MACHINE FOR MANUFACTURING GLASS BOTTLES, &c.
APPLICATION FILED JAN. 26, 1903.

7 SHEETS—SHEET 1.

Witnesses—

Inventor
Frank H. Pierpont
by Church & Church
his Attorneys

No. 795,304. PATENTED JULY 25, 1905.
F. H. PIERPONT.
MACHINE FOR MANUFACTURING GLASS BOTTLES, &c.
APPLICATION FILED JAN. 26, 1903.

7 SHEETS—SHEET 3.

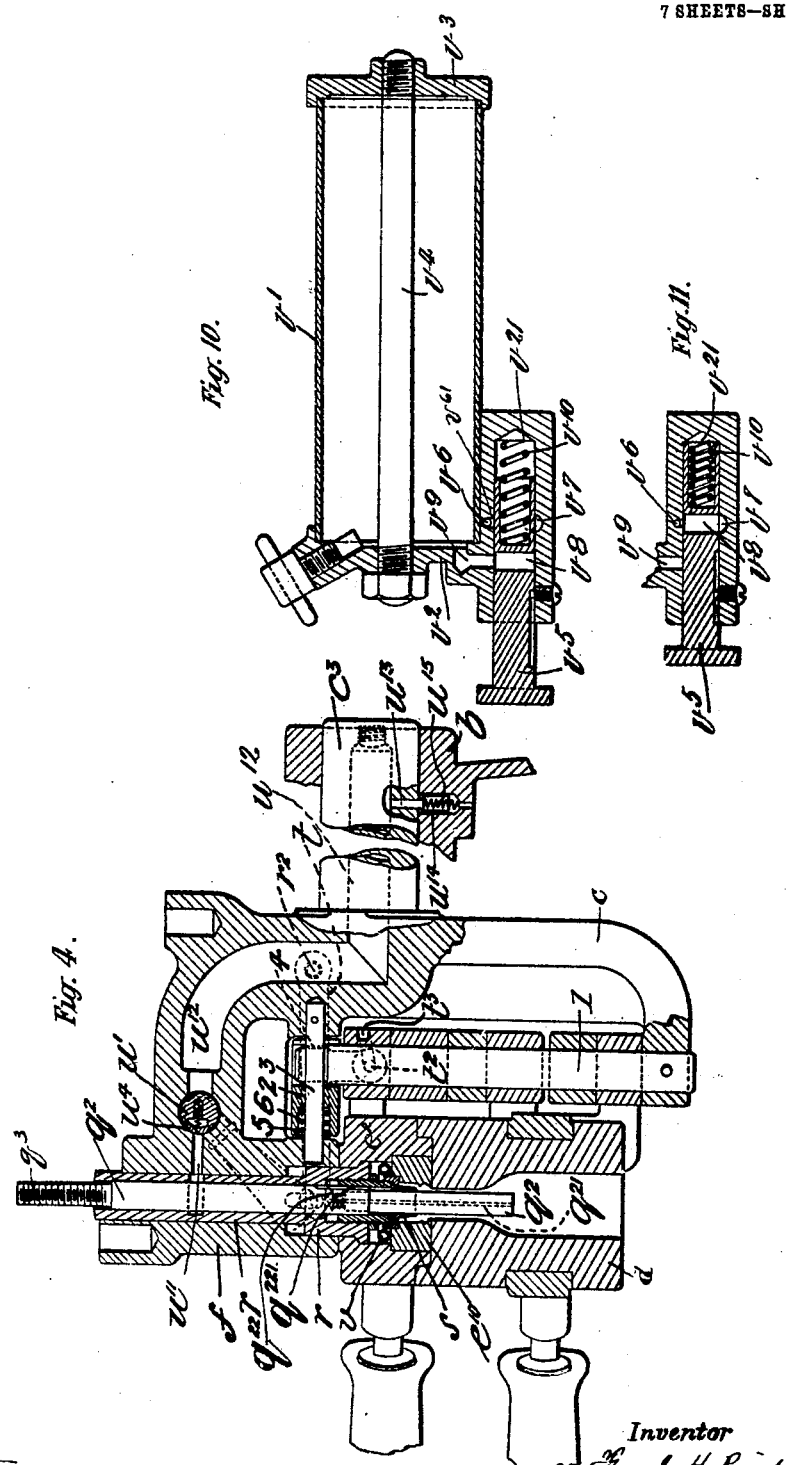

No. 795,304. PATENTED JULY 25, 1905.
F. H. PIERPONT.
MACHINE FOR MANUFACTURING GLASS BOTTLES, &c.
APPLICATION FILED JAN. 26, 1903.
7 SHEETS—SHEET 5.
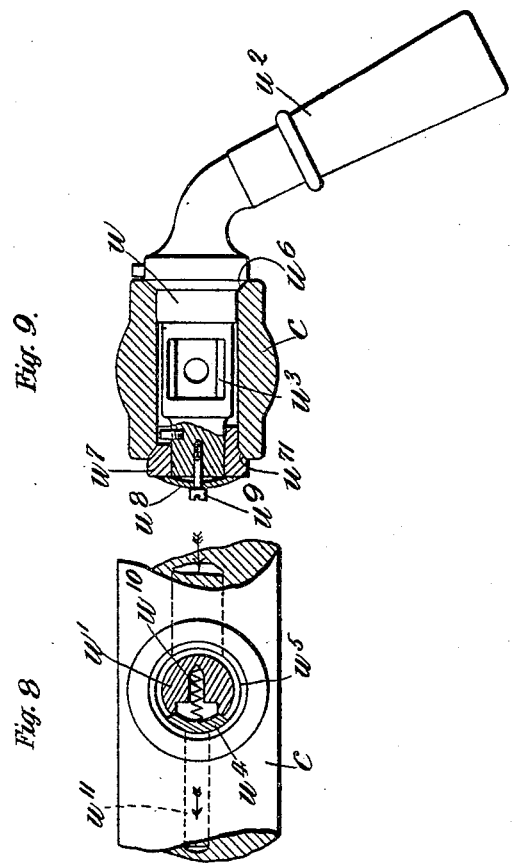
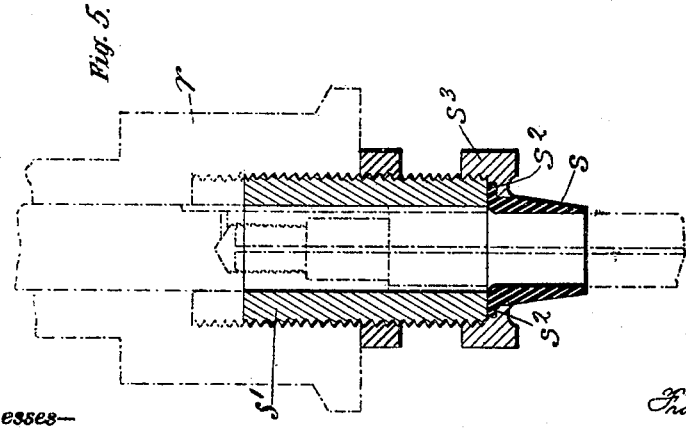
Witnesses—
Inventor
Frank H. Pierpont,
by Church & Church
his Attorneys.

No. 795,304. PATENTED JULY 25, 1905.
F. H. PIERPONT.
MACHINE FOR MANUFACTURING GLASS BOTTLES, &c.
APPLICATION FILED JAN. 26, 1903.

7 SHEETS—SHEET 6.

Witnesses
Thomas Durant
Stuart Church

Inventor
Frank H. Pierpont
by Church & Church
his Attorneys

No. 795,304. PATENTED JULY 25, 1905.
F. H. PIERPONT.
MACHINE FOR MANUFACTURING GLASS BOTTLES, &c.
APPLICATION FILED JAN. 26, 1903.

7 SHEETS—SHEET 7.

Witnesses— Inventor
Thomas Bryant Frank H. Pierpont
 by
 his Attorneys

UNITED STATES PATENT OFFICE.

FRANK H. PIERPONT, OF HORLEY, ENGLAND.

MACHINE FOR MANUFACTURING GLASS BOTTLES, &c.

No. 795,304.  Specification of Letters Patent.  Patented July 25, 1905.

Application filed January 26, 1903. Serial No. 140,667.

*To all whom it may concern:*

Be it known that I, FRANK HINMAN PIERPONT, a citizen of Great Britain, residing at Horley, in the county of Surrey, England, have invented certain new and useful Improvements in Machines for the Manufacture of Glass Bottles and other Vessels, of which the following is a specification.

This invention relates to machines for the manufacture of glass bottles and other vessels, and comprises a number of improvements which have for their general object to simplify and render more effective the operation of the machine, so that well-formed large bottles may be expeditiously produced in a machine that is simple in construction and easy and convenient in operation.

The invention has for its object to arrange the finishing-molds so as to be capable of rapid and convenient operation, to permit of the employment of finishing-molds of the ordinary "hand" type, and to dispense with the use of separate locking-handles for each set of finishing-molds.

The invention has also for its object to provide means for raising the mouth-casting nipple out of the bottle-neck on the neck-mold, being swung for the release of the finished bottle, to provide means for self locking and unlocking the parts of the parison-mold on their being respectively closed and opened, to provide a simple construction of air-admission valve, to provide means for spraying oil onto the mouth-casting nipple, to provide means for positioning the upper ends of the hinging-rods of the finishing-mold-carrying brackets, to arrange the parison-molds and neck-molds separate from the hinging parts or brackets by which they are carried and on which the locking devices are mounted.

The invention has also for its object to provide convenient means for the renewal of the nipple employed for the purpose of forming the mouth of the neck-bore.

The invention has also for its object to hold and work the suspended parison when the parison-mold is removed and after the parison is positioned for closure upon it of the finishing-mold. Ordinarily this operation is performed by hand and by means of a spoon; but it is the object of the invention to perform this by arranging the bottom mold for the purpose in the manner hereinafter described.

The invention also has for its object to provide convenient means for casting or forming the internally-screwed neck to the bottle, while, furthermore, the invention has for its object to accurately position the parison-mold around the neck-mold and to avoid imposing strains upon the parison and neck mold parts that usually result from inaccurate fitting or by the variations of temperature to which the said parts are subjected when the machine is in operation.

Figure 2:
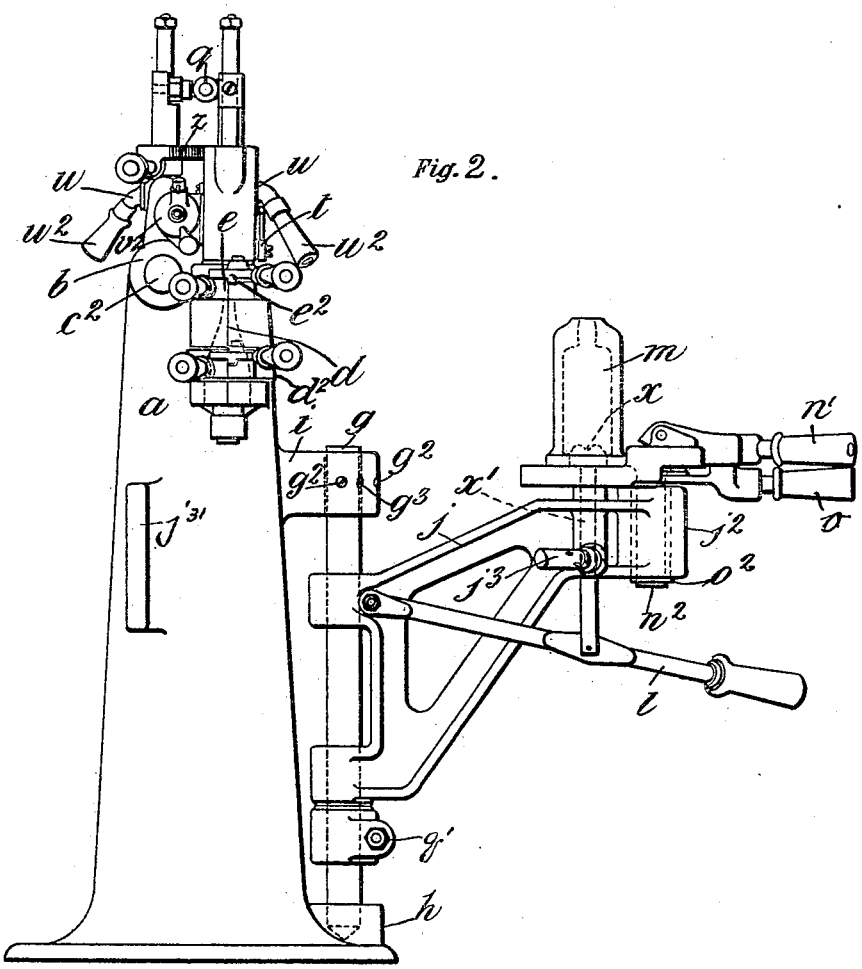
Figure 3:
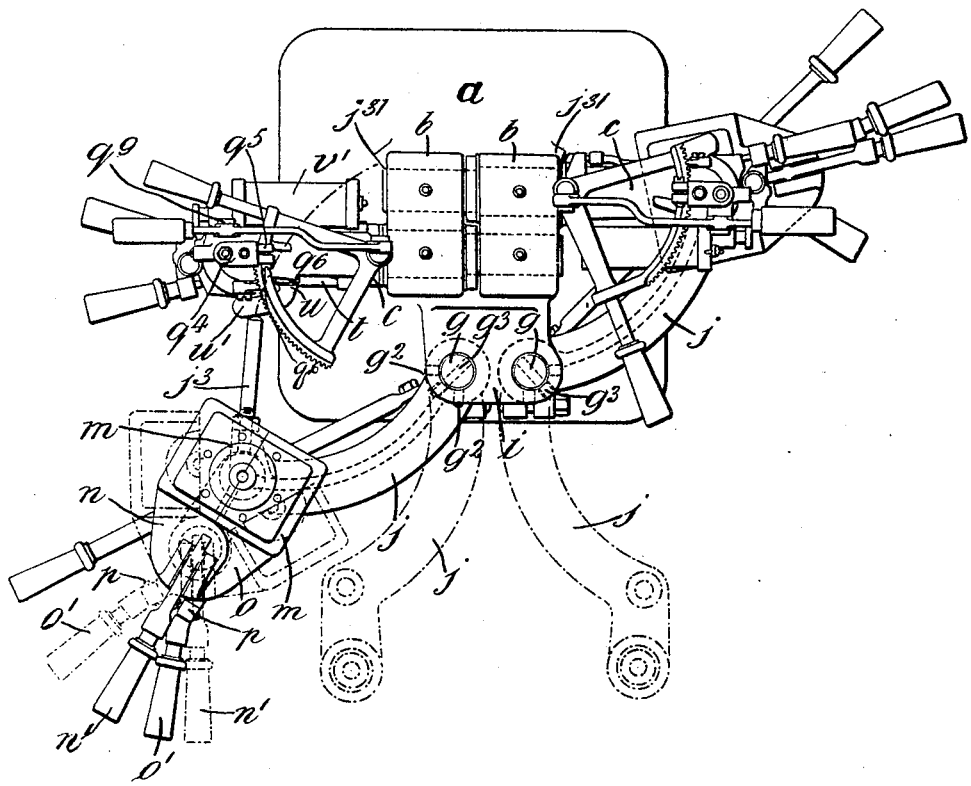
Figure 12:
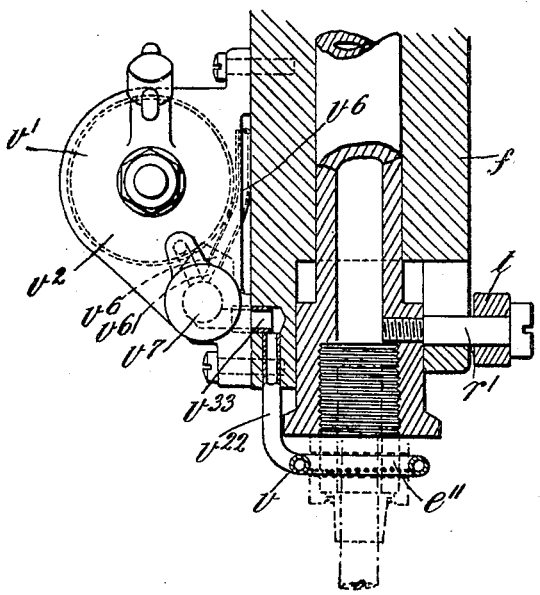
Figures 6, 7:
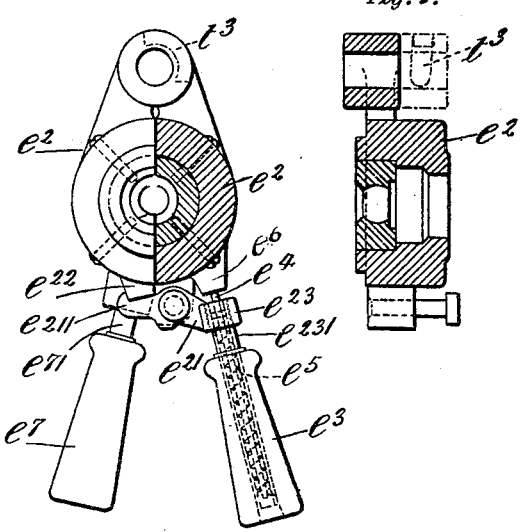
Figure 13:
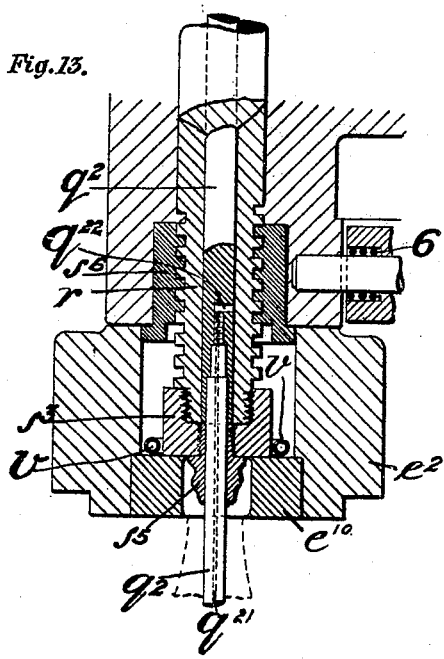
Figures 14, 15:
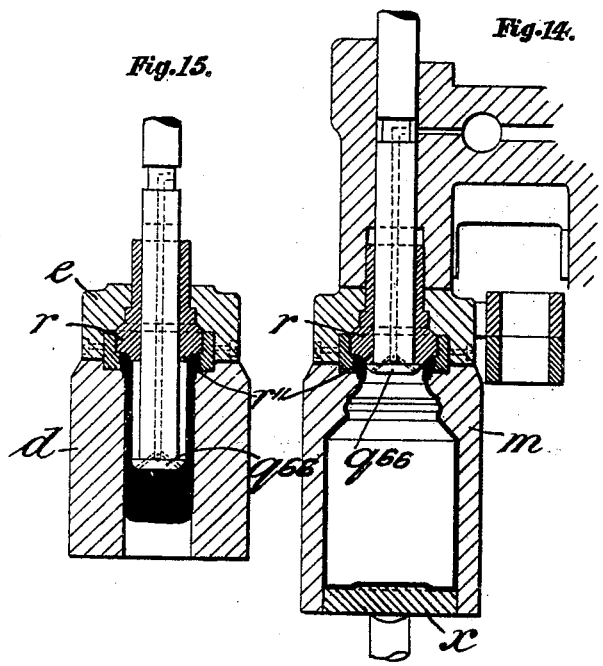

In the drawings, Figures 1, 2, and 3 are respectively side elevation, end elevation, and plan views of a double glass-bottle-blowing machine provided according to the invention and designed for the production of large bottles—such as beer-bottles, whisky-bottles, and champagne-bottles—and with means for forming corking or screwed mouths thereon. Fig. 1 on the left-hand side shows the parison and neck molds closed, but in position ready for opening the parison-mold and for bringing the finishing-mold into position, while on the right-hand side the parison-mold is shown opened and the finishing-mold in position for blowing. Fig. 2 is an end elevation corresponding to the left-hand side of Fig. 1, showing the carrying-bracket of the finishing-mold extended. Fig. 4 is a detailed sectional elevation of the rotatable bracket by which the plunger, neck-mold, and parison-mold are carried. Fig. 5 is a detailed sectional elevation showing the manner in which the mouth-forming nipple of the bottle is secured to the sleeve. Fig. 6 is a detailed part-sectional plan showing the manner in which the neck-mold parts or the parison-mold parts are carried by the hinging-brackets and the manner in which the neck-mold and parison-mold are fastened or unfastened. Fig. 7 is a detailed sectional elevation corresponding to Fig. 6. Figs. 8 and 9 are respectively detailed part-sectional elevation and a cross-section of the air-valve and that part of the rotating bracket *c* in which it is mounted. Fig. 10 is a detailed sectional elevation of the oil-reservoir; and Fig. 11 is a section corresponding to Fig. 10, showing the oil-supplying plunger in its farthermost position. Fig. 12 is a detailed sectional elevation showing the oil-reservoir in position upon the plunger-boss *f*. Fig. 13 is a sectional elevation of the neck and parison mold parts as provided for the formation of bottles with a screw-neck. Fig. 14 is a detailed elevation showing the application of the machine, the formation of the plunger, neck, and parison, and finishing mold parts for the production of glass jars and similar vessels. Fig. 15 is a sectional elevation corresponding to Fig. 14, showing the parison-mold in position for the formation of the parison.

In carrying the invention into effect in a double machine, or one having two sets of molds for the use of two workmen, as illustrated in Figs. 1 to 3 of the accompanying drawings, I provide a frame $a$, at the top of which bearings $b\ b$ are formed and constitute supports for oppositely-arranged rotating brackets $c$, the latter in turn carrying the parison-molds $d$, the neck-molds $e$, and the plunger-boss $f$, respectively. The rotating brackets $c\ c$ are so arranged that the parison-molds $d$ may be moved into their uppermost position—i. e., diametrically opposite to that indicated in Figs. 1 to 3—for the reception of a charge of metal. The handle $q$ may be used for the purpose, and after receiving the metal the parison-molds $d$ are brought down into the position indicated in Figs. 1 to 3 for the subsequent blowing and finishing operations to be performed.

On one side of the frame $a$ are two vertical rods $g$, the lower extremities of which are supported in step-bearings $h$, while the upper extremities are held in a bracket $i$. These rods $g$ are preferably arranged some little distance from the center of the pillar-frame $a$ and support two carrier-brackets $j$ of substantially equal length. The carrier-brackets $j$ have their rear extremities formed into bearings $k\ k$, through which the respective rods $g$ pass and form vertical axes, upon which the brackets turn. The vertical position of the brackets on the shafts is determined by clamping-collars $q'$. Each bracket $j$ may be swung under the neck-molds and parison or swung away for cooling and removing the finished bottle by hand, and the bottom-mold-operating hand-lever $l$ may be employed for the purpose.

Finishing-molds $m$ of the ordinary hand-pattern may be employed in the machine, and in the preferred construction one-half the mold $m$ is bolted in a determined position upon and near the extremity of each of the pivoted arms $n\ o$, mounted upon the extremity of the carrier-bracket $j$. The pivoted arms $n\ o$ are provided with handles $n'\ o'$, one, $n'$, of which is so connected as to be capable of a slight vertical displacement to permit of the handle being locked, with the finishing-mold $m$ closed by means of an adjustable screw-stop on the second pivoted arm $o$. This adjustable stop may conveniently consist of a screw-threaded pin $p$, passing through the arm $o$, the extremity of the pin serving as a stop whereby on the closure of the mold parts the handle $n'$ may be lifted over and pressed down behind the stop $p$, as illustrated in Figs. 2 and 3.

The pivoted arms $n\ o$ may have journals formed by hollow bosses $n^2\ o^2$, one fitting within the other and the outer one fitting in the boss $j^2$ of the carrier-bracket $j$.

Each carrier-bracket $j$ is preferably provided with an adjustable pin $j^3$ or boss adapted to contact with a stop $j^{31}$, whereby its position under the neck-molds $e$ and parison may be positively and exactly determined.

A sleeve $r$, Figs. 4 and 5, carrying the mouth-casting nipple $s$, is mounted in the bracket $c$ so as to be capable of a vertical movement, whereby the nipple $s$ may be entirely withdrawn from the mouth of the bottle when the latter is finished and ready to be removed by the lateral movement of the carrier $j$. For controlling the nipple and sleeve a lever $t$, Figs. 1 to 5, is provided, one extremity of which is connected to the sleeve $r$ by a pin $r'$, Fig. 12, while its opposite extremity is pivoted at $r^2$ upon the rotating carrier-bracket $c$. An arm $t'$ of this lever $t$ is provided with a pin $t^2$ or a roller for engaging within a box or open cam $t^3$, Fig. 4, formed on the boss of the holder $e^2$ of one of the neck-mold parts. The arrangement and operation are such that on the opening of the neck-mold $e$ to release the neck of a finished bottle the lever $t$ aforesaid is lifted, carrying with it the sleeve $r$ of the nipple $s$, leaving the finished bottle free to be removed.

The invention is not limited to the arrangement of the lever $t$ as hereinbefore described, as it is obvious that other equivalent means could be provided for communicating motion from one or other of the hinged holders or parts $e^2$ of the neck-mold to the sleeve $r$, carrying the nipple $s$.

A divided movable ring or mold-plate $e^{10}$ is mounted in the neck-mold holders to constitute the direct forming-surface.

The holders $e^2$ or $d^2$ of the parison or neck mold parts or the parison or neck mold parts themselves may be provided with means for locking the respective parts in position on the closure of the mold, the arrangement being preferably such that by the mere separation of the operating-handles the unlocking results. Figs. 6 and 7 illustrate the holders for the neck-mold, and it will be understood that the holders $d^2$ for the parison-mold are substantially the same. For the purpose stated one of the holders $e^2$ or one of the parts of the parison-mold itself may be provided with a pawl $e^{21}$, one end of which, $e^{211}$, is hook-shaped to engage a projection $e^{22}$ in corresponding position upon the other holder $e^2$ or part of the mold. The opposite end $e^{23}$ of the pawl carries a handle $e^3$, and within the handle is a pin $e^4$, which under the action of a spring $e^5$ is forced out against a stop $e^6$, provided on the holder or mold part. The handle is preferably a perforated tube $e^{231}$, fitted upon the end $e^{23}$ of the pawl $e^{21}$, upon which tube the handpiece $e^3$ is mounted. The other holder or mold part $e^2$ is provided with a handpiece $e^7$, preferably having a tubular and perforated stem $e^{71}$. The arrangement is such that on bringing the two holders or mold parts $e^2$ together for closure the forward part $e^{211}$ of the pawl rides over the projection $e^{22}$ and by means of the spring $e^5$ aforesaid a locking engagement results, as illustrated in Fig. 6. When the pawl-handle $e^3$ is pushed away from the handle $e^7$, the spring $e^5$ is compressed and the handle end $e^{23}$ of the pawl $e^{21}$ gives way to the pressure, thereby swinging the pawl outwardly and releasing the same and permitting the mold parts to open. The opening and closure of the neck-mold, as well as the parison-mold, may thus be effected by merely touching and separating the handles without gripping them, which in working is advantageous, owing to the great heat to which they are subject.

An air-valve $u$, Figs. 1, 4, 8, and 9, is provided on the rotating bracket $c$, preferably formed as a plug $u'$, furnished with an operating-handle $u^2$. The body of the plug is recessed at $u^3$ for the reception of a segmental plate $u^4$, which closely but freely fits into the recess, and the recess is in communication with air under pressure by the annular space $u^5$, left between the plug and the bore or recess provided for it transversely in the bracket $c$. The plug $u'$ itself does not fit closely within the bore or recess provided for it in the bracket; but it is provided with a seating $u^6$ at one end, while a collar $u^7$ on the other end of the plug is provided with a seating $u^{71}$, whereby a tight joint is insured on each side of the recess. The collar $u^7$ is maintained in position on the reduced end of plug $u'$ by a plate $u^8$ on the end of the plug $u'$ and held by a screwed pin $u^9$.

The segment $u^4$ is forced outwardly by a spring $u^{10}$ or the air-pressure, and when the plug is turned into one position or the other the segment fits closely against the port $u^{11}$. The bracket $c$ has an air-passage $u^{12}$, Fig. 4, leading axially through the trunnion $c^3$ of the bracket. A transverse hole $u^{13}$ may be provided in the trunnion $c^3$ to register with a corresponding tube $u^{14}$ in the bearing-boss $b$ when the bracket $c$ is in position for blowing. A spring $u^{15}$ insures a tight joint against leakage between the trunnion and tube $u^{14}$. The air under pressure may be led from a reservoir in the pillar-frame or direct from the compressor.

For spraying oil upon the mouth-casting nipple I provide a nozzle preferably in the form of a circular tube $v$, Figs. 4 and 12, located within a recess in the neck-mold holders $e^2$ and immediately above the divided mold-plate $e^{10}$, this tube $v$ being provided with a series of perforations $e^{11}$, Fig. 12, through which oil may be ejected onto the nipple $s$ for cooling it when it is uplifted by the lever $t$, as hereinbefore described. Oil is led into this tube $v$ from a reservoir $v'$, Figs. 1, 2, 3, 10, 11, and 12, fixed on the bracket $c$. Within this reservoir $v'$ a suitable quantity of oil is stored, and the reservoir is preferably a cylinder, Figs. 10 and 12, with end caps $v^2$ $v^3$ held together by a longitudinal rod $v^4$. Upon the cap $v^2$ a cylinder $v^{21}$ is provided for the reception of a plunger-piston $v^5$. A tube $v^6$, branching from the air-conduit, admits pressure into the cylinder $v^{21}$ through a port $v^{61}$, passing into the cylinder $v^{21}$ in position to be controlled by the plunger-piston $v^5$. In a diametrically opposite position to the port $v^{61}$ a port $v^7$ is provided in the said cylinder $v^{21}$ and is connected with the annular tube $v$ aforesaid through the tube $v^{33}$ and branch tube $v^{22}$, fitted in the plunger-boss $f$. (See Fig. 12.)

A hole $v^8$ extends across the diameter of the piston-plunger $v^5$ and in the normal position of the plunger, Fig. 10, lies in coincidence with a port $v^9$, leading from the oil-reservoir $v'$, so that it may normally receive a charge of oil. The piston-plunger $v^5$ normally is forced out by spiral spring $v^{10}$; but on being forced inwardly, Fig. 11, the hole $v^8$, containing the charge of oil, comes into alinement with the air-port $v^{61}$ and with the oil-port $v^7$, whereby the air-pressure forces the charge through the oil-port $v^7$ into the annular tube $v$, and the oil is distributed in spray upon the nipple, the quantity being in all cases the same.

The rods $g$, Figs. 1 to 3, upon which the finishing-mold parts are mounted, are adjusted laterally at their upper ends, so as to bring the molds into the required position, by screws $g^2$ in the bracket $i$ contacting with the upper extremity of the rods $g$ aforesaid and a screw $g^3$ passing through in a plain hole in the carrying-bracket $i$ and threaded in the rod $g$, its forward extremity abutting against the farther side of the hole in the bracket $i$. Two screw-pins $g^2$ are screwed into the bracket $i$ in the same plane as the screws $g^3$, but in angular positions in relation thereto, and their forward ends abut against the sides of the rod $g$, so that the extremity of the rod $g$ may be adjusted in any direction within the limits determined by the diameter of the hole in the bracket $i$. (See Fig. 3.) In will be understood that any usual mechanism for effecting such lateral adjustment may be substituted without departing from this feature of the invention.

The parison-molds $d$ and the neck-molds $e$ are separate from but suitably secured to the hinging arms or brackets $e^2$ $d^2$, Figs. 1 to 3, by which they are carried, and separate also from the locking or fastening devices, Figs. 6 and 7, so that when changing the molds it is not necessary to remove the hinging-brackets $e^2$ and $d^2$, but is only necessary to remove the mold parts $e$ and $d$, which may be at once replaced without difficulty.

The operating hand-lever $q$, Figs. 1 to 4, of the plunger $q^2$ is connected to it in such manner as to permit of a slight adjustment and is provided with means whereby the respective positions into which the plunger $q^2$ must be put for the necessary operations in the production of a complete bottle are determined. The plunger $q^2$ is screw-threaded at its upper extremity $q^3$, Fig. 4, and its screwed extremity passes through a plain hole provided in a boss $q^4$, Figs. 1 and 3. Within this boss $q^4$ a horizontal space is formed transversely to the hole aforesaid, which space receives another boss $q^5$, Figs. 1 and 3, which is split and screw-threaded for the reception of the threaded extremity $q^3$ of the plunger. A screw $q^6$, passing through the split parts of the boss $q^5$, draws them together, thereby clamping the boss upon the screwed part $q^3$ of the plunger $q^2$. When the said clamped boss $q^5$ is made free, the screwed part $q^3$ of the plunger $q^2$ may be turned to accurately adjust the stroke of the plunger $q^2$. The larger boss $q^4$ aforesaid is provided with a second hole, so that it may slide upon the rod $w$, fixed upon the plunger-boss $f$ of the rotating bracket $c$. Notches $w'$ $w''$ $w'''$ are provided in this fixed rod $w$, corresponding to the respective positions in which the plunger has to be brought in the various operations of the machine, and upon the boss $q^7$ a pin $q^8$ is provided, acting under spring-pressure and adapted to pass into the notches $w'$ $w''$ $w'''$ in order to position the operating-lever. A sufficient pressure on the lever, however, will force the pin $q^8$ back and permit the lever to move. $w'$ represents the notch that positions the plunger for blowing, $w''$ that for casting, and $w'''$ that for the extreme limit of the plunging stroke. The operating-handle $q$ is connected to the boss $q^4$ by a pivot-pin $q^9$, Fig. 3, immediately behind the handle, while the rear extremity $q^{10}$ of the operating-lever $q$ is carried in a pillar $q^{11}$, provided for the purpose.

Hitherto in the employment of a nipple for the formation of the mouth of the neck-bore the nipple has been made integral with a sleeve; but inasmuch as the nipples require frequent renewal considerable expense is involved by the necessary renewal of the sleeve at the same time. I provide a nipple $s$, Fig. 5, separate from the sleeve $r$, by which it is carried, and of a peripheral shape corresponding to the shape required to be given the mouth of the neck-bore, the nipple $s$ illustrated being suitable for the formation of a corking-mouth. The nipple $s$ is provided tubular for the passage of the plunger $q^2$, and a circular flange $s^2$ is formed at the top, by which it may be held upon the screwed tubular part $s'$ of the sleeve $r$ by a flanged nut $s^3$. When the nipple $s$ has in working become deformed, the nut $s^3$ is unscrewed and a new nipple substituted, whereby the heavy expense and annoyance of renewing the complete sleeve is avoided. The nut $s^3$, by which the nipple $s$ is held in position, preferably constitutes a molding-plate, being provided with a circular groove $s^4$ for the formation of the top outer edge or lip of the neck.

The bottom mold $x$ is capable of a vertical movement for the purpose of holding the parison preparatory to blowing in the finishing-mold, and when the finishing operation has to be performed the bottom mold may then be lowered into position for blowing the bottle within the finishing-mold. As a convenient construction the bottom $x$ has its stem $x'$ extended through a vertical bearing in the carrier and connected with an operating-lever pivoted on the carrier $j$, as shown in Fig. 2. The bottom mold $x$ thus operates to prevent the deformation of the parison, which would result in an uneven or irregular thickness being given to the parison when blown in the finishing-mold and result in an imperfect bottle. In operation the parison is brought into its lowermost position and the finishing-mold partially closed upon it, so that the parison can be seen while being worked by the bottom mold $x$. When the parison is ready for blowing, the bottom mold $x$ is immediately lowered and the finishing-mold completely closed.

When providing for the production of "screw-neck" bottles, as illustrated in detail in Fig. 13, I form the molding plate or boss $s^3$ with a downwardly-protruding screwed nipple $s^5$ for the molding of the neck. I provide the sleeve $r$ near its lower extremity with a thread of the same pitch as that of the screwed nipple $s^5$, the threaded part of the sleeve passing through a screw-nut or bush $s^6$, fitted in the boss $f$ of the rotating carrying-bracket $c$. The sleeve $r$ may be extended upwardly and carry a key for engagement with a keyway in the plunger $q^2$, which passes through the sleeve $r$; and a crank-handle or other means for rotating the sleeve may be provided, so that the molding plate or boss $s^3$ and nipple $s^5$ may be withdrawn from the bottle-neck after it has been molded. It is preferred to effect the rotation of the screwed sleeve $r$ by providing a long pinion $y$ upon the upper extremity of the plunger $q^2$, which gears with a toothed sector $z$, Figs. 1, 2, and 3, whereby the unscrewing of the nipple $s^5$ from the neck of the bottle may be effected by one stroke of the operating-handle $z'$ of the toothed sector $z$. The latter is mounted upon the lower reduced part of the pillar $q^{11}$. It will be understood that the plunger $q^2$ may be reciprocated freely without any effect upon the sleeve $r$, molding-boss $s^3$, and screw-nipple $s^5$ whose movement is determined by the toothed sector $z$, as described. It is preferred that the screwed nipple should be projected into position before serving the metal into the parison-mold, so that the neck may be cast before the bottle is "finished." The molding boss or plate $s^3$ and nipple $s^5$ may be integral; but it is preferred to have them separate, as illustrated in Fig. 13 or as in Fig. 5, so that the nipple may be renewed without the necessary renewal of the molding boss or plate.

During the production of a bottle the mold parts, plunger-casing, and frame-carrying parts are subjected to very high temperatures, and the expansion in various planes across the molds and across the plunger-casing is variable. The result is that when the parison-molds are brought into position beneath and around the neck-molds some of the hinges and arms are subjected to great strain, or, on the other hand, it is difficult or impossible to bring the molds into perfect alinement with the neck-mold and the plunger-casing. One of the objects of the present invention is to remedy this defect, for which purpose the parison-molds and neck-molds are hinged upon a pin or bolt the lowermost extremity of which is fixed pivotally, but the uppermost extremity is capable of a certain lateral displacement corresponding to the variable expansion of the parts involved, a spring being preferably employed to hold the upper part of the hinging-pin. As illustrated in Fig. 4, the parison and the neck mold brackets $c^2$ $d^2$ are hinged to a vertically-disposed pin 1, the lower extremity of which is pivotally mounted in the lower extremity of the rotatable bracket $c$. The upper extremity of the pin or bolt 1 rides within a transversely-arranged sliding collar or sleeve 2, mounted on a pin 3, extending across from the plunger-boss $f$ to the main part of the rotatable bracket $c$, the upper extremity of the hinging pin or bolt 3 being slotted or the parts cut away to prevent interference, as shown at 4. A strong spiral spring 5 is arranged within an annular groove 6 formed at one extremity of the sliding collar 2 and abuts against the plunger-boss $f$, thereby forcing the sliding collar 2 outwardly against the bracket $c$ to maintain the upper extremity of the hinging pin or bolt 1 in an upright position. The spring thus supports the extending mold parts and allows of any necessary slight lateral movements of the parison-mold $d$. It will be understood that by this arrangement of the parison-mold the results of slight inaccuracies in the construction and fitting of the molds may also be made good.

The plunger $q^2$ is formed with its lower extremity slightly reduced, so that when it is withdrawn into the uppermost position corresponding to the notch $w'$ an annular space will be left between the end of the plunger and the nipple $s$, through which the air may pass for blowing. As shown, the lower end of the plunger is separate and screwed to the main part, but is provided with a central hole $q^{21}$ and a transverse hole $q^{22}$, while an axial slot $q^{221}$ is provided in the lower end of the part of the plunger $q^2$, through which the air may pass from the port or passage $w^{11}$ when the plunger $q^2$ is in its uppermost position.

In operation oil may be sprayed upon the nipple when lifted in proximity to the circular tube $v$—for example, on one side. The rotating bracket $c$ is put into position diametrically opposite to that on the other, Fig. 1, with the neck-mold and parison-mold closed and with the plunger slightly protruding beyond the edge of the nipple $s$, as when the plunger-operating lever is in the notch $w^{11}$. The metal is then introduced into the parison-mold. The parison is then plunged by causing the lever $q$ to advance to the notch $w^{111}$, and the plunger is then immediately retracted to the position of the notch $w'$. The rotating bracket $c$ is then positioned exactly as illustrated on the left side of Fig. 1, and the parison-mold is opened. The open finishing-mold of the corresponding bracket $j$ is brought into position immediately beneath the neck-mold, and the finishing-molds are brought into position in proximity to the parison. The bottom mold is then lifted by means of the lever $l$, so that the parison may be worked or formed while at the same time being blown, the air for the purpose being admitted by the air-valve $u$, as hereinbefore described. When the operator observes that the parison is in proper form for blowing, the finishing-mold is instantly closed, and air is admitted into the parison by the air-valve $u$ to blow and finish the bottle. The neck-mold is then opened, and in opening the nipple $s$ is drawn upwardly, as hereinbefore described, so that the finished bottle may then pass away from under the neck-mold upon the carrier-bracket, from which it may be taken to the annealing-oven.

In the application of the invention to machines for making glass jars and the like, as illustrated in Figs. 14 and 15, the plunger $q^2$ is provided with mushroom head $q^{66}$, and the sleeve $r$ is provided as the neck-molding block, being formed with an inwardly-protruding part $r^{11}$ for the formation of the mouth of the jar.

It will be noted that while the neck and parison molds are pivoted on an axis on the side of the plunger and nipple toward the body of the machine, and therefore on the side of the mold opposite the operating-handles, the axis for the finishing-mold sections is located between the operating-handles and molds. At the time when the finishing-molds are in position the hinge of its sections is therefore on the outer side of the bottle or parison. From this construction it follows that the molds may be positioned—i. e., opened and closed—around the parison much more quickly and conveniently than heretofore. The finishing-mold sections do not have to be swung open through such wide arcs in order to receive the parison, and the finishing-mold parts may be caused by the movement of the carrying-bracket to approach and surround the parison while permitting the parison to be worked by the bottom mold and, if necessary, inflated. In connection with the manner of mounting and operating the finishing-molds the pins $g$, providing for exact adjustment, are of special importance.

Having thus described my invention, what I claim as new, and desire to secure by Letters Patent, is—

1. In a machine for the manufacture of glass bottles the combination with the frame and finishing-mold, of a carrying-bracket for the finishing-mold mounted on a vertical axis to swing horizontally said bracket being vertically adjustable on said axis, and mechanism on the frame with which the mold coöperates to form a bottle when the bracket is in one position of adjustment; substantially as described.

2. In a machine for the manufacture of glass bottles, the combination with the frame and finishing-mold, of a carrying-bracket for the finishing-mold mounted on a vertical axis to swing horizontally means for shifting the position of the axis transversely and mechanism with which the mold coöperates to form a bottle when the bracket is in one position of adjustment; substantially as described.

3. In a machine for the manufacture of glass bottles, the combination with the frame and finishing-mold, of a carrying-bracket for the finishing-mold, a vertical shaft forming the axis on which said bracket swings means for adjusting one end of said shaft transversely and mechanism with which the mold coöperates to form a bottle when the bracket is in one position of adjustment; substantially as described.

4. In a machine for the manufacture of glass bottles, the combination with the frame and finishing-mold, of a carrying-bracket for the finishing-mold, a vertical shaft forming the axis on which said bracket swings, a collar adjustable on the shaft for supporting the bracket, set-screws for adjusting the upper end of the shaft transversely and mechanism with which the mold coöperates to form a bottle when the bracket is in one position of adjustment; substantially as described.

5. In a machine for the manufacture of glass bottles, the combination with the sectional neck-mold and means for opening and closing the same, of a reciprocatory nipple for forming the mouth of the bottle and mechanism for reciprocating the nipple connected with the neck-mold to raise the nipple when the mold is open; substantially as described.

6. In a machine for the manufacture of glass bottles, the combination of a sectional neck-mold and reciprocatory nipple connected for unitary movement in planes at right angles to each other to open and close the mold and raise and lower the nipple; substantially as described.

7. In a machine for the manufacture of glass bottles, the combination with the sectional neck-mold with means for opening and closing the same and a reciprocatory nipple for forming the bottle-mouth, of a lever for moving the nipple and a connection between said lever and one of the mold-sections, to lift said nipple when the neck-mold sections are opened; substantially as described.

8. In a machine for forming glass bottles, the combination with the body-mold and means for supplying air under pressure, of a sleeve having a nipple for forming the inner side of the mouth of the bottle, a removable ring on the sleeve and surrounding the nipple to retain the latter in place on the sleeve and to form the outer side of the mouth of the bottle and a plunger through which the air is admitted, working through the sleeve and nipple; substantially as described.

9. In a machine for forming glass bottles, the combination with the body-mold and means for supplying air under pressure, of a sleeve, a nipple separate therefrom but extending in line therewith, a ring surrounding the nipple and secured to the sleeve to retain the nipple in place, said nipple and ring forming the male portion of the mouth-mold, a plunger working through the sleeve and nipple and having a duct for the admission of air and means for advancing the plunger; substantially as described.

10. In a machine for forming glass bottles, the combination with the body-mold and an air-pressure supply, of a plunger through which the air is supplied to the mold, a lever for reciprocating the plunger, an adjustable connection between the plunger and lever and means for holding the lever in adjusted position; substantially as described.

11. In a machine for forming glass bottles, the combination with the body-mold and an air-pressure supply, of a plunger through which the air is supplied to the mold, an adjustable connection between the lever and plunger and a notched bar and spring-stop for holding the lever in definite positions of adjustment for different steps in the manipulation of the glass; substantially as described.

12. In a machine for forming glass bottles, the combination with the finishing-mold and means for supplying air under pressure thereto, of a movable bottom for said mold and means for reciprocating said bottom to work the parison before the bottle is finished; substantially as described.

13. In a mechanism for forming glass bottles, the combination with the horizontally-movable finishing-mold, a parison-mold and plunger through which air is supplied under pressure, of a vertically-movable bottom mold and means for reciprocating the same to work the parison before the bottle is finished; substantially as described.

14. In a glass-bottle machine, the combination with a compressed-air supply, of a sectional mold and a transversely-movable shaft pivotally connecting the sections to compensate for expansion and contraction due to changes in temperature; substantially as described.

15. In a glass-bottle machine, the combination with a compressed-air supply, and a vertically-movable plunger through which air is supplied, of a sectional mold held in position transversely to register with the plunger by spring-pressure and capable of yielding to compensate for expansion and contraction; substantially as described.

16. In a glass-bottle machine, the combination with the plunger and sleeve, of a sectional mold centered by the plunger and sleeve and a spring-pressed yielding pivot on which the sections of the mold are pivoted; substantially as described.

17. In a glass-bottle machine, the combination with the plunger and sleeve, of a sectional mold centered by the plunger and sleeve, a pivot on which the mold-sections hinge to open and close pivotally mounted at one end and a spring for holding its opposite end in position; substantially as described.

18. In a machine for the manufacture of glass bottles, the combination with the frame, bracket journaled on a horizontal axis, sectional parison and neck molds and plunger mounted on said bracket and reversible therewith, of a bracket mounted to swing beneath the parison and neck molds and a sectional finishing-mold mounted on said bracket, the sections of the parison and finishing molds being hinged on vertical axes located on opposite sides of the position of the parison in blowing whereby either of said molds may be closed around the parison when the sections of the other mold are open; substantially as described.

19. In a machine for the manufacture of glass bottles, the combination with the frame, sectional parison and neck molds supported by the frame having their sections hinged together on an axis located between the frame and parison when in finishing position, of the sectional finishing-mold, having its sections hinged together on a vertical axis located on the outer side of the parison when in finishing position; substantially as described.

20. In a machine for the manufacture of glass bottles, the combination with the frame, and movable finishing-mold bracket journaled on a vertical axis on the frame, of the sectional parison and neck molds journaled on the frame to close around the parison from the side toward the frame, and the sectional finishing-mold journaled on the movable support in position to close around the parison from the side away from the frame; substantially as described.

21. In a machine for the manufacture of glass bottles the combination with the frame, the movable finishing-mold bracket journaled on a vertical axis on the frame the vertically-reciprocatory bottom mold on the bracket and means for reciprocating said bottom mold, of the neck and parison molds journaled on the frame to close around the parison from the side toward the frame and the sectional finishing-mold journaled on the bracket on the outer side of the bottom mold to close around the parison and bottom mold from the side away from the frame; substantially as described.

22. In a machine for the manufacture of glass bottles the combination with the frame, the movable bracket journaled on a vertical axis on the frame and the neck and parison molds journaled on the frame above the bracket, of the vertically-reciprocatory bottom mold and finishing-mold having horizontally-movable sections both said bottom and finishing molds being mounted on the movable bracket; substantially as described.

23. In a machine for the manufacture of glass bottles the combination with the frame, and means for blowing the parison, of a mold for forming the parison composed of sections hinged together and supported by the frame, handles on the sections and a catch for holding the sections closed connected with one of the handles and adapted to be released by a movement of the handle in a direction to open the mold; substantially as described.

In witness whereof I have signed my name to this specification in the presence of two subscribing witnesses.

FRANK H. PIERPONT.

Witnesses:
WILLIAM EDWARD EVANS,
FRIDOLIN FREI.